(12) United States Patent
Bassi et al.

(10) Patent No.: US 10,273,086 B2
(45) Date of Patent: Apr. 30, 2019

(54) CONVEYOR BELT HAVING MAGNETIC LINEAR ENCODER READABLE MARKERS

(71) Applicant: Habasit AG, Reinach (CH)

(72) Inventors: Giuseppe Bassi, Vidardo (IT); Gianfranco Marcon, Cappella Maggiore (IT); Sergio Bertacchi, Ranica (IT); Matteo Mapelli, Castellanza (IT); Andreas Lehmann, Basel (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 15/558,629

(22) PCT Filed: Mar. 10, 2016

(86) PCT No.: PCT/EP2016/055083
§ 371 (c)(1),
(2) Date: Sep. 15, 2017

(87) PCT Pub. No.: WO2016/146463
PCT Pub. Date: Sep. 22, 2016

(65) Prior Publication Data
US 2018/0099813 A1    Apr. 12, 2018

(30) Foreign Application Priority Data

Mar. 18, 2015 (EP) ..................................... 15159566

(51) Int. Cl.
*B65G 15/34* (2006.01)
*B65G 15/64* (2006.01)
*B41J 11/00* (2006.01)

(52) U.S. Cl.
CPC ............. *B65G 15/34* (2013.01); *B41J 11/007* (2013.01); *B65G 15/64* (2013.01); *B65G 2203/0283* (2013.01); *B65G 2203/043* (2013.01)

(58) Field of Classification Search
None
See application file for complete search history.

(56) References Cited

U.S. PATENT DOCUMENTS

2007/0284225 A1* 12/2007 Volpi .................. B29C 45/0013
                                                      198/805
2008/0049054 A1*  2/2008 Tabata ....................... B41J 3/44
                                                      346/74.5

(Continued)

FOREIGN PATENT DOCUMENTS

CA           2092160 A1    9/1993
DE      102008061732 A     6/2010

(Continued)

*Primary Examiner* — Kavel Singh
(74) *Attorney, Agent, or Firm* — Hodgson Russ LLP (57) ABSTRACT

A conveyor belt (1) for conveying a good in a belt travel direction, comprising magnetic markers (21,22) embedded into the belt, the magnetic markers (21,22) being arranged in at least one row (2) parallel to the belt's travel direction, characterized in that a) the magnetic markers (21,22) are formed of a matrix of an elastomeric, thermoplastic elastomeric or thermoplastic material with particles of a ferromagnetic material embedded therein, b) the matrix is filled with the ferromagnetic material particles in an amount of 60 to 90 vol %, based on the sum of matrix and ferromagnetic material particles; c) the geometric thickness of the markers is 30 to 70% of the overall thickness of the belt; and d) the ferromagnetic material has a maximum energy product $(BH)_{max}$ in the range of 30 to 100 k J/m$^3$. The belt is suitable for prolonged use in single pass line-head inkjet printers and allows precise position determination of the belt.

19 Claims, 5 Drawing Sheets

(56) References Cited

U.S. PATENT DOCUMENTS

| 2008/0192076 | A1 |   | 8/2008 | Suzuki |   |
|---|---|---|---|---|---|
| 2008/0218577 | A1 |   | 9/2008 | Suzuki |   |
| 2013/0126310 | A1 | * | 5/2013 | Neuhaeuser | ............ B65G 15/32 198/690.1 |

FOREIGN PATENT DOCUMENTS

| JP | 59007944 | A | * | 1/1984 | ............ B65H 5/021 |
|---|---|---|---|---|---|
| JP | 61-89878 | A |   | 5/1986 |   |
| JP | 2001-125333 | A |   | 5/2001 |   |
| JP | 2006/096429 | A |   | 4/2006 |   |
| WO | 2014/047512 | A2 |   | 3/2014 |   |

\* cited by examiner

CONVEYOR BELT HAVING MAGNETIC LINEAR ENCODER READABLE MARKERS

TECHNICAL FIELD

The present invention relates to a conveyor belt comprising a periodic pattern of magnetic markers embedded into the belt, being arranged in a row running in parallel to the belt's travel direction. The invention furthermore concerns a conveying device comprising such belt. In particular it also concerns a single pass inkjet printer comprising such belt.

PRIOR ART

In any conveyor device which is integrated with other machine components or equipment and where the speed and position of substrates on the conveyor belt must be synchronized with other devices, as with pick-and-place, filling or printing applications, accurate conveyor belt position control is required. A customary way of determining the position of a conveyor belt during operation has been the use of a rotatable wheel which is in non-slipping contact with the belt's conveying surface, wherein the moving belt causes the wheel to rotate, and the wheel's rotation is translated into a belt travel distance.

Conveyor belts comprising magnetic markers that allow the determination of the position of the belt by an appropriate magnetic detector, and conveying devices using such belts, have also been known for some time. Reference is made by way of example to DE 10 2008 061 732 A. The magnetic markers of this publication are steel wires or steel cables vulcanized into the belt.

Single pass inkjet printers are a special type of conveying device which simultaneously print an image onto the conveyed good. The basic colours (in the simplest CMYK model black, yellow, magenta and cyan, in more sophisticated models optionally more colours such as light magenta and light cyan, in some cases up to nine basic colours) are ejected as small ink dots from nozzles of individual printing heads which are spaced apart from each other in the longitudinal direction by some offset. The printing heads with colour nozzles extend over the entire transversal width of the substrate, so that a transversal movement of the printing heads is not necessary. By this arrangement it is possible to sequentially print all basic colours in one single pass onto the substrate, whereby the substrate is transported from one printing head to the next one, in order to obtain the fully printed image with all colours. Inkjet printers of this type are called in the art "line-head inkjet printers". Non-basic colours are formed by mixing two or more of the basic colours, which is done by superposing ink droplets of different basic colours. The inkjet printer must thus be able to print ink droplets of different basic colours, originating from different printing heads being longitudinally spaced apart by some offset, onto the same site of the substrate. Considering e.g. a printing resolution of 600 dpi (dots per inch) means a positioning tolerance of ±21 μm for each drop of color. This tolerance should be maintained along the entire print process area length which increases with increasing distance between the printing heads spacing and with increasing number of basic colors. This requires that the printing driver synchronises the ink ejection of the printing heads and exactly knows the position of the substrate at any time while it is conveyed from one printing head to the next one with a tolerance as low as possible and in any case not exceeding the printing resolution.

Several publications disclose single pass line-head inkjet printers with a conveyor belt having magnetic markers for position determination of the belt. These are JP 61/089878, JP 2001/125333, JP 2006/096429, US 2008/0192076 and US 2008/0049054. These publications are silent as to the composition of the magnetic strip contained therein. Applicant believes that the conveyor belts of these publications simply contained a magnetic recording tape of the type used in audio cassettes or magnetic tape reels. In particular the belt of US 2008/0192076 has an overall thickness of 0.1 mm and the thickness of the magnetic layer, thus essentially the geometric thickness of the markers, is 0.01 mm (see its table 1). The geometric thickness of the markers is thus only 10% of the overall thickness of the belt. This geometric thickness of magnetic layer and magnetic markers is characteristic for a magnetic recording tape in the foregoing sense. JP 61/089878 explicitly mentions in the abstract that a "magnetic tape" was used. Magnetic recording tapes in the foregoing sense have a very high filling degree of ferromagnetic particles in the magnetic layer matrix, approaching 100 vol %, based on the matrix, and/or comprise a ferromagnetic material with an energy product exceeding 100 kJ/m$^3$. This is in order to achieve the required magnetic fluxes for good readability, despite the very small thickness of the magnetic layer. Furthermore such magnetic recording tapes have a very high Young's modulus in a typical order of magnitude of several GPa. Such magnetic recording tapes, once included into a conveyor belt, do not thus allow an appropriate pre-tensioning thereof because the magnetic recording tape would simply break apart upon pre-tensioning, rather than only being stretched to some extent. Still furthermore, with the arrival of more performant recording media such as USB sticks, CD's, DVD's, blu-ray discs and large volume hard disk drives, the future availability of magnetic recording tapes is not guaranteed.

Applicant is not aware of any commercially available magnetic tape or magnetic strip which is advertised as suitable for incorporation into a conveyor belt.

DE 4139524 discloses a conveyor belt with magnetic markers, wherein the magnetic markers are of ferromagnetic material embedded either into a flat ribbon applied on top of the belt, or into a round cord applied laterally to the belt. The former is a further example of a thin magnetic tape as discussed above, being very thin with respect to the thickness of the overall belt (see FIG. 3). Concerning the latter DE 4139524 hints on the other hand at that it should have a diameter corresponding to the overall thickness of the belt (column 2, lines 52-61, FIGS. 1 and 2).

The present invention aims to provide an improved conveyor belt of the type illustrated in the foregoing.

SUMMARY

The present invention thus provides:
1. A conveyor belt for conveying a good in a belt travel direction, comprising magnetic markers embedded into the belt, the magnetic markers being arranged in at least one row parallel to the belt's travel direction, characterised in that
    a) the magnetic markers are formed of a matrix of an elastomeric, thermoplastic elastomeric or thermoplastic material with particles of a ferromagnetic material embedded therein,
    b) the matrix is filled with the ferromagnetic material particles in an amount of 60 to 90 vol %, based on the sum of matrix and ferromagnetic material particles;

c) the geometric thickness of the markers is 30 to 70% of the overall thickness of the belt; and d) the ferromagnetic material has a maximum energy product $(BH)_{max}$ in the range of 30 to 100 kJ/m$^3$.

2. The belt of above [1], wherein the material of the matrix is elastomeric or thermoplastic elastomeric.

3. The belt of above [2], wherein the elastomeric material is NBR or EPDM or the thermoplastic elastomer is TPU.

4. The belt of above [1], [2] or [3], wherein the ferromagnetic material is barium ferrite or strontium ferrite.

5. The belt of one of above [1] to [4], wherein the matrix of elastomeric or thermoplastic elastomeric material with particles of a ferromagnetic material embedded therein is in the form of a strip running in parallel to the longitudinal direction of the belt, and the strip is embedded in a groove formed in a cover layer.

6. The belt of above [5], wherein in the cover layer the thermoplastic elastomer is TPU or TPO or the thermoplastic is PVC.

7. The belt of one of above [1] to [6], which is monolithic.

8. The belt of above [5] or [6], which furthermore comprises an upper traction layer, wherein the upper traction layer is arranged below the cover layer.

9. The belt of above [8], which furthermore comprises a lower traction layer and an intermediate layer comprising or consisting of a thermoplastic or a thermoplastic elastomer, wherein the intermediate layer is arranged below the upper traction layer and the lower traction layer is arranged below the intermediate layer, such that the intermediate layer is sandwiched between upper traction layer and lower traction layer.

10. The belt of above [9], wherein the intermediate layer comprises or consists of a thermoplastic elastomer or a thermoplastic.

11. The belt of above [10], wherein in the intermediate layer the thermoplastic elastomer is TPU or TPO or the thermoplastic is PVC.

12. The belt of one of above [1] to [11], which comprises a top layer comprising or consisting of a thermoplastic elastomer or a thermoplastic and covering the magnetic markers.

13. The belt of above [12], wherein in the top layer the thermoplastic elastomer is TPU or TPO or the thermoplastic is PVC.

14. The belt of one of above [1] to [13], comprising exactly one row of magnetic markers.

15. The belt of one of above [1] to [14], wherein the magnetic markers within one row are identical to each other and are evenly spaced in that row such as to form a periodic marker pattern with a spatial frequency $\xi_m$ in the belt's travel direction.

16. The belt of one of above [1] to [15], which is open-ended and has two ends.

17. The belt of one of above [1] to [15], which is endless and has an end-joining zone of length $L_j$ in the belt's longitudinal direction.

18. The belt of above [17], wherein in the end-joining zone of length $L_j$ the magnetic markers are not linear encoder readable.

19. A single pass line-head inkjet printer comprising a belt according to one of above [17] or [18].

BRIEF DESCRIPTION OF THE FIGURES

FIGS. 4 and 5 show results of a synchronisation test using belts of the invention, wherein FIG. 4 is from a synchronisation test on the new belt and FIG. 5 is from a synchronisation test on the same belt, but after having gone through an endurance test.

DETAILED DESCRIPTION OF THE INVENTION

The (neat) ferromagnetic material used in the belt of the invention has at room temperature a maximum energy product $(BH)_{max}$ in the range of 30 to 100 kJ/m$^3$, preferably of 35 to 70 kJ/m$^3$ and more preferably of 40 to 60 kJ/m$^3$. For the purposes of the invention the maximum energy product is determined on the B (y-axis) vs. H (x-axis) curve, i.e. the hysteresis curve of the solid, neat ferromagnetic material. The maximum energy product is the area of the largest possible rectangle that can be inscribed under the second quadrant of the hysteresis curve, wherein the second quadrant is the quadrant encompassed by the negative section of the H axis (x-axis) and by the positive section of the B axis (y-axis).

The (neat) ferromagnetic material used in the belt of the invention at room temperature has preferably at room temperature a coercivity $(_BH_C)$ in the range of 30 to 200 kA/m, more preferably of 40 to 160 kA/m. For the purposes of the invention the $_BH_C$ is determined as usual in the art, namely as the length of the intersection of the said hysteresis curve with the negative portion of the H axis (x-axis).

The (neat) ferromagnetic material used in the belt of the invention has preferably at room temperature a residual flux density, or remanence, $(B_r)$ in the range of 0.5 to 3 T, preferably of 0.8 to 2 T. For the purposes of the invention the $B_r$ is determined as usual in the art, namely as the length of the intersection of the said hysteresis curve with the positive portion of the B axis (y-axis).

The matrix of elastomeric or thermoplastic elastomeric material comprising the particles of ferromagnetic material has preferably at room temperature a maximum energy product $(BH)_{max}$ in the range of 1 to 15 kJ/m$^3$, more preferably in the range of 3 to 10 kJ/m$^3$.

The matrix of elastomeric, thermoplastic elastomeric or thermoplastic material comprising the particles of ferromagnetic material has preferably at room temperature a coercivity $(_BH_C)$ in the range of 80 to 250 kA/m, more preferably of 90 to 200 kA/m.

The matrix of elastomeric or thermoplastic elastomeric material comprising the particles of ferromagnetic material has preferably at room temperature a residual flux density, or remanence $(B_r)$, in the range of 100 to 300 mT, preferably of 120 to 270 mT.

The ferromagnetic material is not particularly limited, as long as it fulfils the foregoing magnetic parameters. It may preferably be selected from the group consisting of alkaline earth metal ferrites (e.g. barium ferrite, strontium ferrite), alnico types, and ferromagnetic chromium(IV)oxide and iron oxide types. Preferably the ferromagnetic material is anisotropic.

The filling degree of ferromagnetic material particles in the matrix is 60 to 90%, preferably 60 to 80 vol %, more preferably 65 to 75% by volume, based on the sum of matrix and ferromagnetic material particles.

The matrix material in which the particles of ferromagnetic material are embedded is either an elastomer, a thermoplastic elastomer or a thermoplastic.

The elastomer is preferably a crosslinked or vulcanized natural rubber or a crosslinked or vulcanized synthetic rubber (e.g. polyisoprene, polybutadiene, styrene-butadiene rubber (SBR), nitrile-butadiene rubber (NBR), ethylene-propylene-diene rubber (EPDM) or acrylate rubber). The preferred elastomers are NBR and EPDM, more preferred is NBR.

The thermoplastic elastomer for the matrix material is selected from one of the customarily known subgroups a) styrenic block copolymers (TPE-s), b) polyolefin blends (TPO), c) elastomeric alloys (TPE-v or TPV), d) thermoplastic polyurethanes (TPU), e) thermoplastic copolyesters and f) thermoplastic polyamides. More preferred are on the one hand TPU's, in particular those made of a) hard segments obtained by reacting aromatic diisocyanates (such as isomeric 2,2'-, 2,4' or 4,4'-diphenylmethane diisocyanate) with aliphatic chain extenders (e.g. $C_2$-$C_6$-diols, such as ethylene glycol, 1,3-propanediol, 1,4-butanediol, 1,5-pentanediol, 1,6-hexanediol, 1,2-propanediol, 2-methylpropanediol, 1,3-butanediol, 2,3-butanediol, 1,3-pentanediol, 1,2-hexanediol and 3-methylpentane-1,5-diol, or glycol ethers, such as diethylene glycol, dipropylene glycol and tripropylene glycol, and aminoalcohols such as ethanolamine, N-methyldiethanolamine) and b) aliphatic polyester polyols or polyether polyols as soft segments. More preferred are on the other hand TPO's.

The thermoplastic for the matrix material is preferably selected from the group consisting of a) homo- and copolymers of vinylic monomers of the structure $XHC=CH_2$, wherein X is selected from the group consisting of chloro, acetoxy, phenyl and cyano, and the copolymerised monomer (for copolymers) is ethylene and/or propene; b) ethylene-alpha-olefin copolymers, wherein the alpha-olefin is preferably selected from the group consisting of propene, 1-butene, 1-hexene, 1-heptene and 1-octene; and c) thermoplastic polyesters. Preferred among the thermoplastics are homopolymers of $ClHC=CH_2$ (=PVC), copolymers of $CH_3COHC=CH_2$ and ethylene (=EVA) and ethylene-1-octene copolymers. The flexibility and/or softness of the thermoplastic may be enhanced by adding a customary and compatible plasticizer.

The most preferred material for the matrix is an elastomer, in particular NBR or EPDM, or a thermoplastic elastomer, in particular TPU.

Preferably the matrix is formed by suspension polymerisation of the elastomer or thermoplastic elastomer with the particles of ferromagnetic material suspended therein with mechanical agitation to keep the mixture homogeneous. At later stage of the polymerisation, when the polymerising mixture has become sufficiently viscous to prevent settling of the ferromagnetic material particles, mechanical agitation may be stopped and an external magnetic field may be applied instead to the polymerising mixture, to force the magnetic orientation of the ferromagnetic particles into a desired preferred direction.

The matrix of elastomeric, thermoplastic elastomeric or thermoplastic material comprising the particles of ferromagnetic material may be provided in the form of a preformed strip, optionally with a suited backing material. The thickness of the strip in a direction perpendicular to the belt's surface plane is preferably in the range of 0.5 to 1.5 mm, more preferably in the range of 0.8 to 1.2 mm. Preformed strips of this type are commercially available in open-ended (linear) form for use in static (non-conveyor belt) applications. Examples thereof at the filing time of this application are the Plastiform® strips of Arnold Magnetic Technologies, Norfolk, Newark, USA, and the Tromaflex® strips of Max Baermann Holding AG, Bergisch Gladbach, Germany.

The belt of the invention may in a first preferred embodiment be monolithic, i.e. it comprises only one cover layer with the above mentioned strip of the matrix material with embedded ferromagnetic particles applied onto or embedded into that layer, and is devoid of a traction layer. The material of the cover layer here may comprise or consist of an elastomer or thermoplastic elastomer as exemplified above for the matrix material.

In a second preferred embodiment the belt comprises one (upper) traction layer and a cover layer arranged above the upper traction layer and applied thereonto. The material of the cover layer here comprises or consists of an elastomer or thermoplastic elastomer as exemplified above for the matrix material. The preferred material for the cover layer is a thermoplastic elastomer, in particular a TPU or TPO, or a thermoplastic, in particular PVC, as exemplified above as preferred for the matrix material. In this embodiment the bottom side of the upper traction layer comes into contact with the pulleys or rollers of a conveying device.

In a more preferred configuration within the said second preferred embodiment the belt of the invention furthermore comprises a second (lower) traction layer, wherein upper traction layer and lower traction layer sandwich in between them an intermediate layer. In this preferred configuration the bottom side of the lower traction layer comes into contact with the pulleys or rollers of a conveying device.

The matrix of elastomeric, thermoplastic elastomeric or thermoplastic material comprising the particles of ferromagnetic material is preferably employed in the manufacture of the belt in the form of the abovementioned strip. One or more such strips can be incorporated into the belt. In one preferred embodiment exactly one such strip is incorporated, which is preferably arranged near one of the lateral edges of the belt. In another preferred embodiment exactly two such strips are incorporated, wherein each strip is preferably arranged near one of the lateral edges of the belt. This latter arrangement may allow to detect if the longitudinal positions of the left and right lateral edges of the belt deviate slightly from each other due to a misalignment of the pulley axes with resulting uneven traction applied onto the belt near its left and right edges. Preferably the strip(s) with the matrix of elastomeric or thermoplastic elastomeric material comprising the particles of ferromagnetic material is(are) incorporated into the cover layer of the belt. In particular it can be embedded into a groove of matching shape which has been milled into the cover layer, the groove running in the longitudinal direction of the belt. The strip may be welded after incorporation to the belt by adhesive or thermoplastic bonding. Preferably the cover layer and the strip of matrix material with ferromagnetic material embedded therein are furthermore overcoated with a top layer to shield the strip from environmental dust or dirt.

The linear encoder-readable magnetic markers are formed into the strip of matrix of elastomeric or thermoplastic elastomeric material comprising the particles of ferromagnetic material by external magnetisation with a magnetic recording head. This magnetisation may either be done before the strip is incorporated into the belt, after incorporation of the strip into the belt, or even after the belt has been included into a conveying device and has been made endless. The markers formed by the magnetisation are preferably a pattern of alternating "up" (i.e. the north pole is, or will be, near the conveying surface of the belt and the south pole is, or will be, near the pulley-contacting surface of the belt) and "down" (i.e. the south pole is, or will be, near the conveying surface of the belt and the north pole is, or will be, near the pulley-contacting surface of the belt) magnetically polarised areas, wherein the orientation of the magnetisation is such that it is (or will be) perpendicular to the belt's conveying surface plane.

The markers may be non-periodic or periodic; preferably, in particular if belt position information is to be derived from them, the marker pattern is a periodic pattern of identical markers being evenly spaced in the marker row in the belt's travel direction, and wherein the "up" and "down" polarised areas are of equal size and shape. Still more preferably the "up" and "down" areas are adjacent to each other essentially without areas of undefined or zero magnetisation in between them. The reciprocal of the distance between the geometric centers (or between their sites producing the maximal magnetic signal) of two consecutive "up" areas or of two consecutive "down" areas in the case of a periodic marker pattern is designated in the following the "spatial frequency $\xi_m$" (number of markers per unit of belt length). The same distance, divided by 2, is designated in the art and herein as the "pole pitch".

The geometric thickness of the markers so introduced is 30 to 70%, preferably 30 to 60% of the overall thickness of the belt.

The magnetic markers so introduced produce a raw magnetic signal which can be detected by magnetic linear encoders arranged at a certain distance, or air gap (distance between linear encoder and magnetic track surface) that is within a specified range and which may depend, if the marker pattern is periodic, on the resolution $1/\xi_m$. For instance, for an air gap in the range of 0.5 mm to 2.5 mm the resolution $1/\xi_m$ may typically be in the range of 1 mm to 5 mm.

If the marker pattern is periodic then the raw signal will be sinusoid. In order to derive a position information from this sinusoid signal it is customary in the art to use magnetic linear encoders which produce as their output an interpolated square wave signal with a spatial frequency $\xi_{LE}$ (number of square waves per unit of belt length) which is an integer multiple of the above defined spatial frequency $\xi_m$ of the marker pattern on the belt, i.e. $\xi_{LE}=\xi_m \times n$, wherein n is an integer>1, such as 5, 10, 100, or wherein n is a power of 2, i.e. $2^m$, wherein m is an integer>1. This interpolated resolution is thus n times finer than the resolution of the periodic magnetic markers on the belt. Such interpolating magnetic linear encoders are readily available on the market. A position-generatic device customarily generates position information from this square wave signal by counting the edges of the square wave signal (such as the rising edges) and dividing the counted number of edges by the known $\xi_{LE}$. The generated position information is thus not continuous but in discrete steps of $1/\xi_{LE}$. It is thus desirable that $\xi_{LE}$ is large, to allow a fine resolution $1/\xi_{LE}$. Most commercially available interpolating linear encoders output a so-called "quadrature" square wave signal, i.e. two square wave signals being offset from each other by 90°, on two channels typically designated as "A" and "B" channel. Using appropriate logic gates the A and B signals may even be combined into one single square wave signal having a spatial frequency of $4\xi_{LE}$. This allows thus a four times finer resolution, $\frac{1}{4}\xi_{LE}$.

The conveyor belt of the invention may preferably comprise, further to the cover layer and magnetic markers, an upper (first), traction layer and more preferably also a lower (second) traction layer, to improve the belt's tensile strength. The traction layer(s) may preferably comprise, or consist of, a woven or non-woven fabric, or may comprise, or consist of, cords running in the transversal direction of the belt. If the traction layer(s) comprise or consist of a woven fabric, then its construction and weave may be as customarily used in the art of conveyor belts, or more preferably, of printing blankets. Examples therefore are plain weave fabrics and twill weave fabrics. The warps of the woven fabric preferably are yarns of spun fibers; more preferably they are of a polyester such as PET. The wefts of the woven fabric preferably are monofilaments, also more preferably of a polyester such as PET. The thickness of the upper traction layer, if present, is preferably in the range of 0.5 to 1.0 mm.

If the conveyor belt of the invention comprises two traction layers (upper and lower) then there is also an intermediate layer sandwiched in between. The material for this intermediate layer is a thermoplastic elastomer or thermoplastic and may be selected from the same materials as described above for the matrix material. Preferably the material for the intermediate layer is again a thermoplastic elastomer selected from TPU and TPO, or a thermoplastic which is PVC. The thickness of the intermediate layer is preferably in the range of 0.4 to 1.0 mm.

The overall thickness of the belt of the invention is preferably in the range of 1.5 to 3.0 mm. More preferably the overall thickness of the belt is in the range of 2.0 to 2.6 mm.

The thicknesses of the individual layers of the belt of the invention can be determined either on the belt itself or after its separation into the individual layers (cutting open, milling off or detaching of layers). However, it may happen that one of the layers does not have a geometrically sufficiently clear shape. In this case, instead of the geometric thickness, the thickness h can be determined as the quotient of the weight per unit area of the layer, $G_L$, (kg/m²) and the mass-average density of all materials in the layer, $\rho$, (kg/m³):

$$h = \frac{G_L}{\rho} = \frac{G_L}{\frac{\sum_{i=1}^{N} m_i \rho_i}{\sum_{i=1}^{N} m_i}}$$

where $m_i$ is the amount of the i-th material of the layer (kg) and the summing is over all N materials occurring in the layer.

The layers of the conveyor belt of the invention are preferably unfoamed.

The bonding together of cover layer, traction layer(s) and intermediate layer traction layer can be done by calendering, extrusion coating or laminating, optionally by co-use of suitable hot-melt or duroplastic adhesive layers. These methods and adhesives are per se all known to the person skilled in the art.

The joining of the belt ends, to make the belt endless, may preferably be done using the so-called "fingerend" method, wherein the two ends of the open-ended belt are cut into a sawtoothed shape in such a way that each tooth of one end can seamlessly abut with a corresponding recess between two teeth of the other end, and vice-versa. Once the teeth of the one end of the belt are engaged seamlessly with the teeth of the other end, the two belt ends are welded together using heat and pressure and optionally with co-use of a hotmelt adhesive. The result is a zig-zagged belt joint extending over the entire transversal width of the now endless belt.

If the magnetic markers have been formed before the end-joining is done then the belt joint overcrosses the row of magnetic markers applied beforehand. As a first consequence of such end-joining, the magnetic markers in that end-joining zone, extending over a length $L_j$ in the longitudinal direction of the belt, may become irregular, undefined, may lose their magnetisation, and/or may even totally be eradicated, so that the magnetic markers in that end-joining zone may no longer be linear encoder readable. $L_j$ may be equal or greater than, or even several times greater than the above mentioned distance between consecutive magnetic markers. In the case of a periodic marker pattern $L_j$ may thus be equal or larger than, or may even be several times $1/\xi_m$, wherein $\xi_m$ is as defined above. As a second consequence of such end-joining, a phase shift $\Delta_m$ of the marker pattern behind the end-joining zone with respect to the marker pattern ahead of the end-joining zone may be present. Thus in one embodiment the magnetic markers are formed after the end-joining of the belt. In another embodiment the magnetic markers are formed before the end-joining of the belt, using a setup of two linear encoders, wherein at least one of the two linear encoders is always outside the end-joining zone, as will be described hereinafter.

Figure 1:
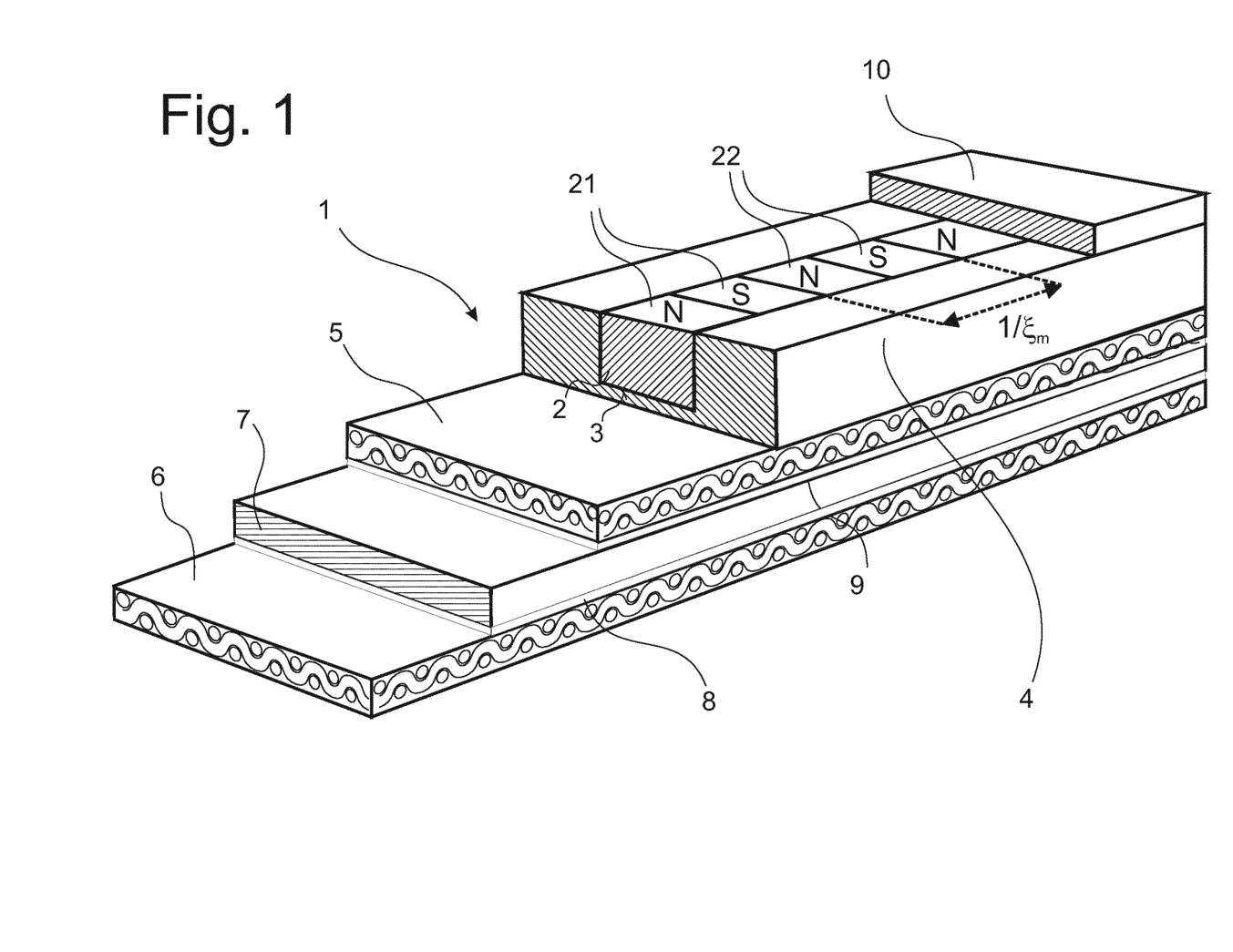
FIG. 1 is a perspective and cross-sectional view of a preferred embodiment of the belt of the invention.

FIG. 1 shows the construction of an exemplary belt of the invention. This belt 1 has a strip 2 of a matrix of elastomeric material (such as NBR) with embedded particles of ferromagnetic material, in particular barium or strontium ferrite. The strip comprises a periodic pattern of magnetic markers (two of these are designated with reference numerals 21, 22) arranged in a row running in parallel to the belt's travel direction (indicated with an arrow). Both the "strip" and the "row" may be assigned the reference numeral 2, since the "strip" is a physical implementation of the "row". Each magnetic marker consists of an "up" (i.e. the north pole N is near the conveying surface of the belt) and a "down" (i.e. the south pole S is near the conveying surface of the belt) magnetically polarised area. The orientation of the magnetisation is such that it is perpendicular to the belt's conveying surface plane. The "up" (N) and "down" (S) polarised areas are of equal size and shape and are adjacent to each other essentially without areas of undefined or zero magnetisation in between them. The strip 2 with magnetic markers 21,22 is embedded in a groove 3 formed into a cover layer 4 made of a thermoplastic elastomer, in particular TPU. The belt 1 furthermore comprises an upper traction layer 5, consisting of a plain weave of PET filaments, a lower traction layer 6, also consisting of a plain weave of PET filaments, and an intermediate layer 7 made of a thermoplastic elastomer, in particular TPU. Also shown are optional adhesive layers 8 and 9 which may be used to bond the upper and lower traction layers 5 and 6 and the intermediate layer 7 together. The belt furthermore comprises a top layer 10 whose primary function may be to shield the magnetic markers 21,22 from environmental dirt. If such belt is used in a conveyer printer, then the substrate to be conveyor device (and printed upon) would lie on either the cover layer 4 or, if the top layer 10 is present, on that top layer. The pulleys of the conveyor device would be in contact with the lower traction layer 6. If the lower traction layer 6 and the intermediate layer 7 were absent, then the pulleys would be in contact with the upper traction layer 5.

The belt of the invention, if containing a periodic marker pattern, may be used in any field where a high precision position determination of the belt is necessary. It may then e.g. be configured and used as a timing belt, positive driven belt, flat belt, positive driven belt or power transmission belt. The preferred application for the belt of the invention with periodic marker pattern is however not in a single pass line-head inkjet printer as described in the introduction, in particular for printing of textiles. Such a printer is in fact a conveying device having at least a drive pulley and a idler pulley and an endless conveyor belt looping around these, but with furthermore the capability to simultaneously print upon a conveyed substrate.

In order to be used in such a printer the belt is preferably provided, magnetised with the periodic marker pattern and made endless as described before, then mounted onto the conveying pulleys of the printer.

The mounted belt will then normally have an end-joining zone of abovementioned length $L_j$ wherein the magnetic signal of the periodic markers may be linear encoder unreadable, as described above. In order to ensure a readable magnetic signal over the entire periphery of the endless belt, including the end-joining zone, it is preferred to provide a setup with two magnetic linear encoders of the type described above, being spaced apart from each other in the longitudinal direction of the belt by a distance $L_{LE}$ which is greater than whatever is considered as the length $L_j$ of the end-joining zone. With such a distance $L_{LE}$ between the two linear encoders it is firstly assured that at any time at least one of the two linear encoders is clearly outside the belt's end-joining zone and can thus detect signals from magnetic markers and provide therefrom the interpolated square wave signal. The first linear encoder is designated in the following the "upstream linear encoder" $LE_u$ (meaning upstream of the second linear encoder, with respect to the belt's travel direction). The second linear encoder is designated in the following the "downstream linear encoder" $LE_d$ (meaning downstream of the first linear encoder, with respect to the belt's travel direction).

In order to decide which of the linear encoders, $LE_u$ or $LE_d$, should be used for providing the interpolated square wave signal from the periodic marker pattern it must be known which of the two linear encoders is imminent to enter the end-joining zone. In this case the square wave signal from the other linear encoder not imminent to enter the end-joining zone must be used. The most reliable way to do this is to provide a reference marker on the belt which indicates the imminent start of the belt's end-joining zone, using a first reference marker detector being designated in the following the "upstream" reference marker detector $D_u$ (meaning upstream of a second reference marker detector, with respect to the belt's travel direction). The same reference marker may also be used to indicate the stepping beyond the end of the belt's end-joining zone, using a second reference marker detector being designated in the following the "downstream" reference marker detector $D_d$ (meaning downstream of the first reference marker detector, with respect to the belt's travel direction). Each of these two reference marker detectors $D_d$ and $D_u$ outputs a signal pulse when it detects the reference marker. The detectors $D_d$ and $D_u$ are also arranged in parallel to the longitudinal direction of the belt and spaced apart from each other in the longitudinal direction of the belt by a distance $L_D$. The reference marker and the associated reference marker detectors are preferably of other than magnetic type, so that the reference marker signal does not interfere with the magnetic signal of the magnetic markers. More preferably the reference marker and associated marker detectors are of the optical type. A first example of a combination of optical reference marker and associated reference marker detectors is a spot printed onto the belt's conveying surface and two optical scanners as the associated detectors. A second example is a hole punched into the belt and two photocells cooperating with respective light sources as the associated detectors. The reference marker is preferably situated near one of the belt's lateral edges and outside the row of magnetic markers.

By default the interpolated square wave signal from the upstream linear encoder $LE_u$ may be used. This default situation is when neither the upstream linear encoder $LE_u$ nor the downstream linear encoder $LE_d$ are within the end-joining zone and the end-joining zone is not in between the two linear encoders. The belt position may preferably be initialised in this default situation at startup time of the conveying device or printer. When during conveying the upstream reference marker detector $D_u$ detects the reference marker, it produces a signal indicating that the square wave signal from the downstream linear encoder $LE_d$ should be used. When the downstream reference marker detector $D_d$ detects the reference marker, it produces a signal indicating that again the square wave signal from the default upstream linear encoder $LE_u$ should be used.

In the above mentioned default situation the square wave signal of the upstream linear encoder $LE_u$ is phase shifted by a distance $\Delta_0$ with respect to the interpolated square wave signal of the downstream linear encoder $LE_d$. This is because $L_{LE}$ is normally not an integer multiple of the resolution of the linear encoders, which is $1/\xi_{LE}$. In the special situation where the end-joining zone of the belt is in between upstream and downstream linear encoder there is a phase shift $\Delta_1$ between upstream linear encoder's square wave signal and downstream linear encoder's square wave signal which is dependent on the said $\Delta_0$ and furthermore on a "true" phase shift $\Delta_c$ between the interpolated square wave signals ahead and behind the end-joining zone. $\Delta_c$ is also due to the end-joining of the belt, as is the phase shift $\Delta_m$ between the marker patterns ahead and behind the end-joining zone. Both $\Delta_0$ and $\Delta_1$ can be determined with a two-channel oscilloscope. The square-wave signals of the two linear encoders are displayed arranged one above the other (one on each channel of the oscilloscope) and the phase shift between the two signals can be directly taken from the display. $\Delta_0$ and $\Delta_1$ can be influenced to some extent upon pretensioning of the endless belt mounted on the printer, which is customarily done with a pretensioning roller which has a moveable axis and is included in the conveying device. Upon pretensioning, the length of the belt increases slightly and thus $\xi_{LE}$ decreases slightly because the pattern of magnetic markers in the belt is slightly stretched:

$$\frac{\xi''_{LE}}{\xi'_{LE}} = \frac{L'_B}{L''_B}$$

wherein $\xi_{LE}'$ and $\xi_{LE}''$ are the spatial linear encoder frequencies in the untensioned (or slightly pretensioned) belt and the fully pretensioned belt, respectively, and $L_B'$ and $L_B''$ are the lengths of the untensioned (or slightly pretensioned) belt and the fully pretensioned belt, respectively.

Figure 2:
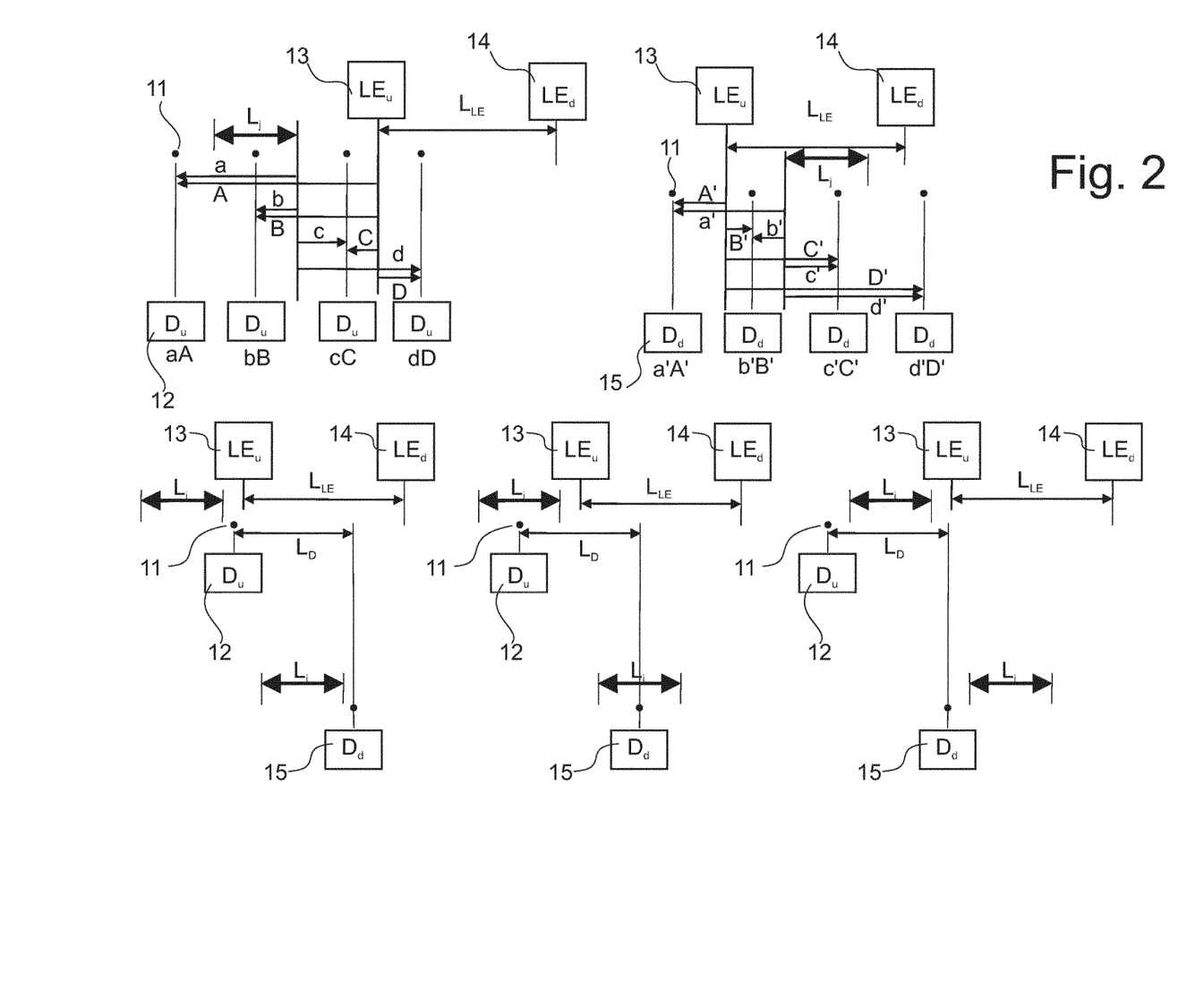
FIG. 2 shows possible arrangements of linear encoders, a reference marker and reference marker detectors.

If the abovementioned switching between upstream linear encoder $LE_u$ and downstream linear encoder $LE_d$, using a reference marker and two reference marker detectors, should work correctly then some considerations of the relative positions of end-joining zone of the belt, the reference marker and the two reference marker detectors must be made, with reference to FIG. 2 showing some possible configurations of the reference marker's position with respect to the belt's end-joining zone and the reference marker detectors $D_u$ and $D_d$. The reference marker is shown in all configurations as a black dot and the belt's travel direction is assumed from left to right. The distance $L_{LE}$ between upstream linear encoder and downstream linear encoder is greater than the length $L_j$ of the end-joining zone of the belt (indicated as bold two-headed arrows), to ensure that always at least one of the two linear encoders is outside the end-joining zone.

Top left of FIG. 2 shows four possible configurations usable to detect the imminent appearance of the belt's end-joining zone, "imminent" meaning that the belt's end-joining zone is about to reach the upstream linear encoder $LE_u$. Configuration a/A/aA has the reference marker behind the belt's end-joining zone, when seen in the belt's longitudinal direction, configuration b/B/bB has the reference marker at a longitudinal position within the belt's end-joining zone, and configurations c/C/cC and d/D/dD have the reference marker ahead of the belt's end-joining zone. Only one of the four reference markers is indicated with reference numeral 11. The belt's end-joining zone $L_j$ has not yet traveled far enough to the right to reach the upstream linear encoder linear $LE_u$, but is imminent to reach it. The vertical lines between the respective upstream reference marker detector $D_u$(aA), $D_u$(bB), $D_u$(cC) and $D_u$(dD) (one of them indicated with reference numeral 12) and the corresponding reference marker indicate that the upstream detector $D_u$ is just detecting the reference marker and will produce a signal to switch from the square wave signal of the default upstream linear encoder $LE_u$, 13, to the one of the downstream linear encoder $LE_d$, 14. It emerges that in all cases the distance between the longitudinal position of the reference marker and the longitudinal position of the start of the belt's end-joining zone, assuming smaller absolute positions in the belt's travel direction (these first distances being designated with lowercase letters a, b, c or d) must always be smaller than the distance between the reference marker's longitudinal position and the longitudinal position of the upstream linear encoder $LE_u$, again assuming smaller absolute positions in the belt's travel direction (these second distances being designated with uppercase letters A, B, C or D). Both said first distances a, b, c and d and said second distances A, B, C and D may thus be positive (arrow points to the left), zero or negative (arrow points to the right).

Top right of FIG. 2 shows four possible configurations usable to detect the end (or overstepping of the end) of the belt's end-joining zone, "overstepping" meaning that the belt's end-joining zone has moved away from the upstream linear encoder $LE_u$ 13. Configurations a'/A'/a'A' and b'/B'/b'B' have the reference marker 11 behind the belt's end-joining zone, when seen in the belt's longitudinal direction, configuration c'/C'/c'C' has the reference marker at a longitudinal position within the belt's end-joining zone and configuration d'/D'/d'D' has the reference marker ahead of the belt's end-joining zone. The belt's end-joining zone $L_j$ has traveled past the upstream linear encoder linear $LE_u$, so the upstream linear encoder $LE_u$ has stepped over the belt's end-joining zone. The vertical lines between the respective downstream reference marker detector $D_d$(a'A'), $D_d$(b'B'), $D_d$(c'C') and $D_d$(d'D') and the corresponding reference marker indicate that the downstream detector $D_d$, 14, is just detecting the reference marker and will produce a signal to switch back from the square wave signal of the downstream linear encoder $LE_d$, 15, to the one of the default upstream linear encoder $LE_u$, 14. It emerges that in all cases the distance between the reference marker's longitudinal position and the longitudinal position of the end of the belt's end-joining zone, assuming smaller absolute positions in the belt's travel direction (these first distances being designated with lowercase primed letters a', b', c' or d') must always be greater than the distance between the reference marker's longitudinal position and the longitudinal position of the upstream linear encoder $LE_u$, again assuming smaller absolute positions in the belt's travel direction (these second distances being designated with uppercase primed letters A', B', C' or D'). Both said first distances a', b', c' and d' and said second distances A', B', C' and D' may thus be positive (arrow points to the left), zero or negative (arrow points to the right).

Bottom left, middle and right of FIG. 2 show three possible configurations of the longitudinal position of the reference marker 11 with respect to the belt's end-joining zone $L_j$, and the longitudinal position of the upstream and downstream reference marker detectors $D_u$, 12, and $D_d$, 15. Bottom left is a configuration with the reference marker ahead of the belt's end-joining zone, bottom middle is the configuration with the reference marker at a longitudinal position within the belt's end-joining zone, and bottom right is the configuration with the reference marker behind the belt's end-joining zone. Each of these three configurations is shown in a first situation (upper part) with the belt's end-joining zone $L_j$ not yet having reached the upstream linear encoder $LE_u$, 13, and in a second situation (lower part) with the belt's end-joining zone $L_j$ having already passed past the upstream linear encoder $LE_u$, 13. The distance that the belt must at least travel from left to right in order to transit from the first situation to the second situation must obviously be greater than $L_j$. During this transit the reference marker 11 simultaneously also travels from left to right by the same minimum distance. Since in the first situation the reference marker 11 is just detected by the upstream reference marker detector $D_u$, 12, and in the second situation is just detected by the downstream reference marker detector $D_d$, 15, it emerges that in all cases the distance $L_D$ between upstream reference marker detector $D_u$ and downstream reference marker detector $D_d$ must also be greater than $L_j$.

Figure 3:
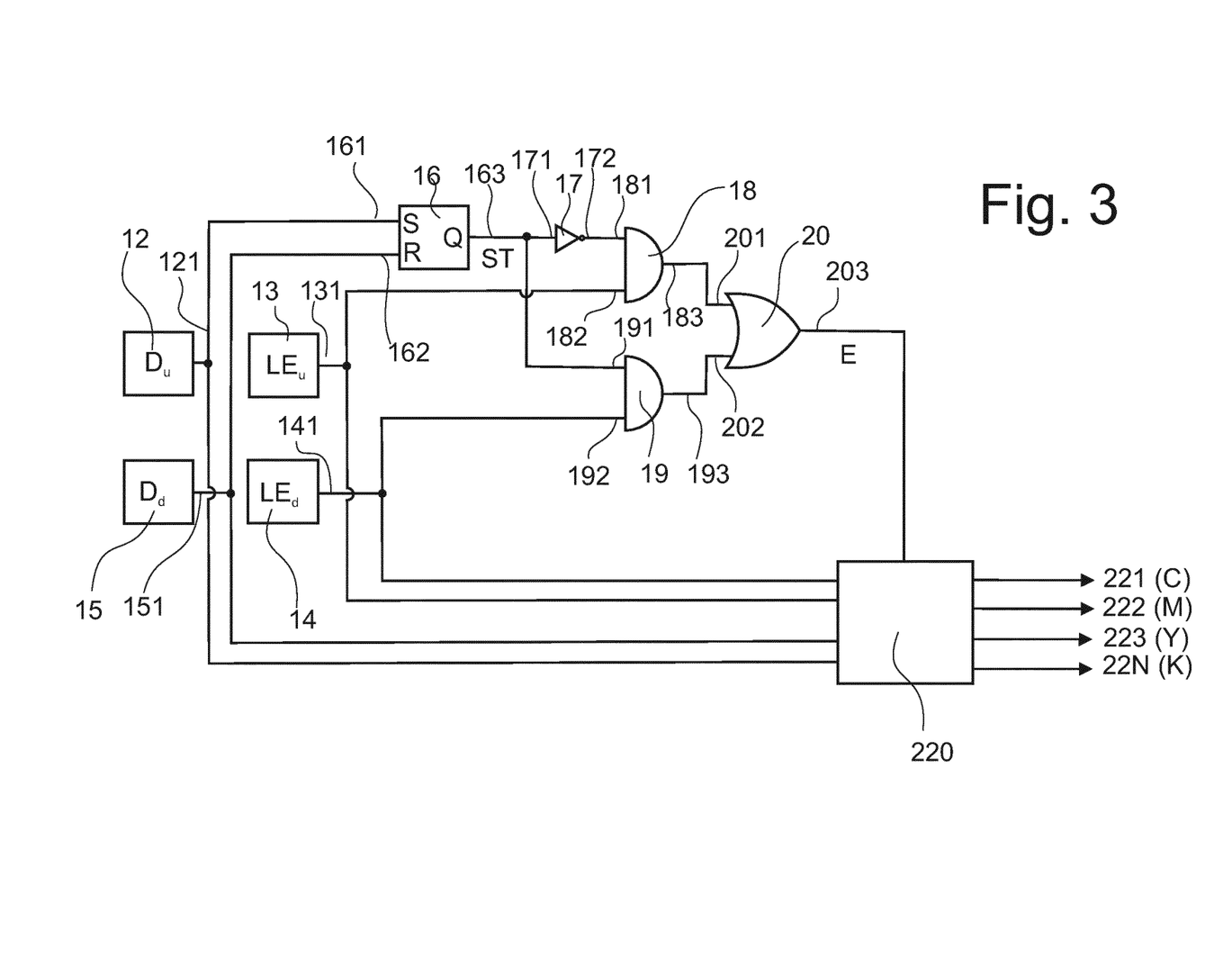
FIG. 3 shows and exemplary latch and control means used to interpret the signals from the reference marker detectors and for switching from the signals of one linear encoder to the other, and vice-versa.

FIG. 3 shows an exemplary latch used to switch from the square wave signal of the upstream linear encoder $LE_u$, 13, which is output on an upstream linear encoder output 131, to the signal of a downstream linear encoder $LE_d$, 14, which is output on a downstream linear encoder output 141, and back; based on the signals produced by an upstream reference marker detector $D_u$, 12, with an upstream detector output 121 and a downstream reference marker detector $D_d$, 15, with a downstream detector output 151. Upstream and downstream linear encoder may output their square wave signals in the form of a signal alternating from "disable" (e.g. 0 or false) level to an "enable" (e.g. 1 or true) level, and backwards. The latch has a flipflop 16 with a flipflop's first input 161, a flipflop's second input 162 and a flipflop's output 163; a NOT gate 17 with a NOT gate's input 171 and a NOT gate's output 172; a first AND gate 18 with a first AND gate's first input 181, a first AND gate's second input 182 and a first AND gate's output 183; a second AND gate 19 with a second AND gate's first input 191, a second AND gate's second input 192 and a second AND gate's output 193; and an OR gate 20 with an OR gate's first input 201, an OR gate's second input 202 and an OR gate's output 203; wherein upstream detector output 121 and downstream detector output 151 are connected to the flipflop's first input 161 and flipflop's second input 162, respectively; the flipflop's output 163 is connected to both the NOT gate's input 171 and the second AND gate's first input 191; upstream linear encoder output 131 and downstream linear encoder output 141 are connected to first AND gate's second input 182 and second AND gate's second input 192, respectively; the NOT gate's output 172 is connected to the first AND gate's first input 181; and first AND gate's output 183 and second AND gate's output 193 are connected to OR gate's first input 201 and OR gate's second input 202, respectively. The flipflop 16 is able to produce on its flipflop output 163 an output signal ST which may toggle from a "disable" (e.g. 0 or false) level to an "enable" (e.g. 1 or true) level, or vice-versa, depending on whether it receives from the flipflop's first input 161 (thus from the upstream detector output 121) or from the flipflop's second input 162 (thus from the downstream detector output 151) a pulse. This toggling signal ST is fed from flipflop's output 163 as such over the second AND gate's first input 191 to the second AND gate 19, and also, after inversion by the NOT gate 17, to the first AND gate's first input 181. If the toggling signal ST is "enable", then the input signal at the first AND gate's first input 181 level is "disable" (inverted by the NOT gate 17) and thus the first AND gate 18 will not output on its first AND gate's output 183 the signal of the upstream detector output 131, but a constant "disable" (e.g. 0 or false) level. Also, with the toggling signal ST being "enable", the input signal at the second AND gate's first input 191 level is "enable" and thus the second AND gate 19 will output on its second AND gate's output 193 the signal of the downstream linear encoder output 141. If the toggling signal ST is on the other hand "disable", then the input signal at the first AND gate's first input 181 level is "enable" (inverted by the NOT gate 17) and thus the first AND gate 18 will output on its first AND gate's output 183 the signal of the upstream detector output 131. Also, with the toggling signal ST being "disable", the input signal at the second AND gate's first input 191 level is "disable" and thus the second AND gate 19 will not output on its second AND gate's output 193 the signal of the downstream linear encoder output 141, but a constant "disable" (e.g. 0 or false) level. The output levels coming from first AND gate's output 183 and second AND gate's output 193 are finally combined by the OR gate 20 to an overall output signal E representing the square wave output of cleanly either the upstream linear encoder $LE_u$, 13, or cleanly of the downstream linear encoder $LE_d$, 14. That overall output signal E, the raw output signals from the upstream and downstream reference marker detectors, $D_u$, 12, and $D_d$, 15, and the raw output signals from the upstream and downstream linear encoders, $LE_u$, 13, and $LE_d$, 14, enter a control means 220 which serves to produce print head signals 221, 222, 223, . . . 22N for CMYK basic colours C, M, Y . . . K as will be explained in detail below.

In the following an exemplary description is given as to how in a printer according to the invention the said output signal E, being square waves with a spatial frequency $\xi_{LE}$, can be further processed into positional information in the form of a set of integer numbers, each of these e.g. representing a line number of an image to be printed onto the conveyed substrate, wherein each integer number is sent to an individual output port associated with a corresponding individual processing unit or individual printing head. This description is in view of a belt having an end-joining zone of length $L_j$ in which the magnetic markers are not linear encoder readable. The line number(s) to be produced actually represent the indexes of image lines of an image having a given spatial frequency $\xi_p$ (in "dots per inch" or "dots per m"). $\xi_{LE}$ is normally a non-integer multiple of $\xi_p$, i.e. $\xi_{LE}=r\times\xi_p$, wherein r is a real, non-integer number; r further square waves correspond to an increase of the image line index by 1. Since $\xi_{LE}$ decreases slightly upon pretensioning of the belt, r will only be known after pretensioning.

Control means 220 comprising: a) wave counting means able to count rising or falling edges (preferably rising edges) of the square waves in the E signal, b) line counting means able to increase an integer number stored therein by 1, and c) summing means able to add the fractional part of above-mentioned r to a real number contained in the summing means, and to add to or subtract from it other real numbers, are provided hereto. At startup time of the conveying, the contents of the wave counting means are initialised to 0, the contents of the summing means are initialised to 0.0 and the contents of the line counting means are intialised to an arbitrary initial line number $L_0$, which normally also will be 0.

In all stages of the conveying where E is a clean square wave output from either the upstream linear encoder $LE_u$ or the downstream linear encoder $LE_d$ with the above defined spatial frequency $\xi_{LE}$ (i.e. no signal switching between the linear encoders occurs) the wave counting means is allowed to count the square waves in E. Each time this count increases up to the integer part of abovementioned r (=[r]) the control means 220 increases the line count stored in the line counting means by 1 and adds the fractional part of above mentioned r (=r−[r]) to the contents of the summing means, then it re-sets the contents of the wave counting means to 0. Furthermore the control means 220 checks after each change in the content of the summing means whether that content has now reached or exceeds 1.0; if so, the control means 220 decreases the count of the wave counting means by 1 (so that its contents are −1 instead of 0) and subtracts 1.0 from the contents of the summing means. Once the content of the wave counting means is −1, the actual wave count that must be counted up by the wave counting means before the contents of the line counting means can again be increased by 1 is not [r], but [r]+1, which delays somewhat the increase of the line counting means by 1. This algorithm accounts for the fact that, due to the non-integer nature of r, somewhat more than [r] square waves of E correspond to one image line. Once the control means 220 has performed the foregoing tasks, the wave and line counting proceeds again as described in the beginning of this paragraph.

In the special stages where E switches from the signal of the upstream linear encoder to the downstream linear encoder, or vice-versa, the control means 220 preferably performs further tasks. This because upon switching, firstly the square wave signal on E undergoes phase shifts, which, in order to take them into account, may be added or subtracted, as appropriate, to the summing means, to cause a premature or delayed, respectively, increase of the line counting means by 1 over the mechanism discussed in the preceding paragraph, where the control means 220 checks the contents of the summing means after each change performed thereto. Secondly the switching as such may cause an extra half wave in the E signal, which extra edge must be disregarded. The further tasks also depend on whether above mentioned $\Delta_0$ and $\Delta_1$ are smaller or equal than $\frac{1}{2}\xi_{LE}$, or greater than $\frac{1}{2}\xi_{LE}$. Still furthermore these further tasks depend on the actual state of the signals of the linear encoders (high or low) at the time of switching. These preferably also further done tasks are as follows, assuming rising edges are counted by the wave counting means:

When E switches from upstream linear encoder signal to downstream linear encoder signal:

| state of upstream linear encoder signal when switching | state of downstream linear encoder signal when switching | task |
|---|---|---|
| a) $0 < \Delta_0 \leq 1/2\xi_{LE}$ | | |
| high | high | subtract ($\Delta_0 \times \xi_{LE}$) from contents of summing means |
| high | low | subtract ($\Delta_0 \times \xi_{LE}$) from contents of summing means, decrease content of wave counting means by 1 |
| low | low | subtract ($\Delta_0 \times \xi_{LE}$) from contents of summing means |
| low | high | subtract ($\Delta_0 \times \xi_{LE}$) from contents of summing means, decrease content of wave counting means by 1 |
| b) $1/2\xi_{LE} < \Delta_0 < 1/\xi_{LE}$ | | |
| high | low | subtract ($\Delta_0 \times \xi_{LE}$) from contents of summing means, decrease content of wave counting means by 1 |
| high | high | subtract ($\Delta_0 \times \xi_{LE}$) from contents of summing means, decrease content of wave counting means by 1 |
| low | high | subtract ($\Delta_0 \times \xi_{LE}$) from contents of summing means, decrease content of wave counting means by 1 |
| low | low | subtract ($\Delta_0 \times \xi_{LE}$) from contents of summing means, decrease content of wave counting means by 1 |

When E switches back from downstream linear encoder signal to upstream linear encoder signal:

| state of upstream linear encoder signal when switching | state of downstream linear encoder signal when switching | task |
|---|---|---|
| a) $0 < \Delta_1 \leq 1/2\xi_{LE}$ | | |
| high | high | subtract ($1 − \Delta_1 \times \xi_{LE}$) from contents of summing means, decrease content of wave counting means by 1 |

-continued

| state of upstream linear encoder signal when switching | state of downstream linear encoder signal when switching | task |
|---|---|---|
| high | low | subtract $(1 - \Delta_1 \times \xi_{LE})$ from contents of summing means, decrease content of wave counting means by 1 |
| low | low | subtract $(1 - \Delta_1 \times \xi_{LE})$ from contents of summing means, decrease content of wave counting means by 1 |
| low | high | subtract $(1 - \Delta_1 \times \xi_{LE})$ from contents of summing means, decrease content of wave counting means by 1 |
| | | b) $1/2\xi_{LE} < \Delta_1 < 1/\xi_{LE}$ |
| high | low | subtract $(1 - \Delta_1 \times \xi_{LE})$ from contents of summing means, decrease content of wave counting means by 1 |
| high | high | subtract $(1 - \Delta_1 \times \xi_{LE})$ from contents of summing means |
| low | high | subtract $(1 - \Delta_1 \times \xi_{LE})$ from contents of summing means, decrease content of wave counting means by 1 |
| low | low | subtract $(1 - \Delta_1 \times \xi_{LE})$ from contents of summing means |

The abovementioned further tasks are only preferred because, once $\xi_{LE}$ is sufficiently high (such as in the order of magnitude of 100,000 m$^{-1}$) the $\Delta_0$ and $\Delta_1$ become very small with respect to $1/\xi_p$ and become neglectable. The abovementioned tasks are thus only intended for high precision and/or when $\xi_{LE}$ is not sufficiently high.

The control means 220 converts the contents of its line counting means, an integer number L, to an output in the form of integer numbers $L_i$, with given indexes i (1≤i≤N). The number $L_i$ is transmitted to the output port with the same index i. E.g. the numbers $L_1$, $L_2$, . . . , $L_N$ are sent to the output ports 221, 222, 223, . . . , 22N, respectively, shown in FIG. 3. A line-head inkjet printer using this information will typically have the same number of print heads; and for each output port with given index i there will be an associated print head with same index i. Accordingly in FIG. 3 the output ports 221, 222, 223, . . . , 22N have been assigned each one of the basic colours of the CMYK model. The value of each $L_i$ and the time when it is transmitted to the output port with same index i will be the information that the associated print head with same index i needs in order to print at that time the image line of its respective CMYK basic colour with given index $L_i$.

The control unit re-prepares the above mentioned numbers $L_i$ and re-transmits them to the associated output ports with same index i each time the contents L of its line counting means has been increased by 1 (as described above). In order to do so, it checks whether L is both a) at least equal to one or more first reference numbers contained in a pre-stored set of lower reference line numbers $Lr_1$, $Lr_2$, . . . $Lr_N$, and b) equal to or smaller than one or more second reference numbers contained in a pre-stored set of upper reference line numbers $Ur_1$, $Ur_2$, . . . $Ur_N$. For each reference number pair $Lr_i/Ur_i$ for which the control means 220 determines that $Lr_i \le L \le Ur_i$, it transmits the value L−$Lr_i$ to the associated output port with that index i. This value L−$Lr_i$ is the sought $L_i$; this $L_i$ and the time when it gets transmitted to the output port with same index i, is the abovementioned information for the associated print head with same index i. Advantageously the indexes i are assigned in such a way to the print heads that the more downstream a print head is (with reference to the belt's travel direction), the higher its index i is.

Each lower reference number $Lr_i$ actually represents the longitudinal offset of the associated print head with same index i with respect to an arbitrarily chosen fixed reference point, in units of $1/\xi_p$ ($\xi_p$ is the above mentioned spatial print frequency in "dots per inch" or "dots per m"). The reference point is however upstream of all of the print heads with respect to the belt's travel direction. Each upper reference number $Ur_i$ in turn is the sum of the corresponding $Lr_i$ plus the maximum number of image lines, $L_T$, contained in the image to be printed. These interpretations of the $Lr_i$ and $Ur_i$ thus assume that the print heads are spaced apart in the longitudinal direction from each other and from the said reference point by an integer multiple of $1/\xi_p$.

The above mentioned control means 220 is preferably an appropriately programmed computer. It may consider the signals of the upstream and downstream reference marker detectors e.g. as interrupts and perform the above described preferred tasks as interrupt handlers.

The invention will now be further illustrated with examples.

Example 1: Synchronisation Errors Test

A belt similar as the one of Fig. was tested. The magnetic strip comprised therein was magnetised to form a periodic magnetic marker pattern of 5 mm magnetic period length. The spatial frequency $\xi_m$ of the pattern of magnetic markers was thus 200 m$^{-1}$ and its pole pitch was 2.5 mm. A set of periodically repeating identical small test images of approximately rectangular shape extending over a section of 1 m length in the longitudinal direction was printed onto the conveying surface of the belt. The number of the test images, $N_i$, was 200. Thus their spatial frequency, $\xi_i$, was 200 m$^{-1}$, which was identical to above $\xi_m$.

The conveyor belt so prepared was made endless and mounted on a laboratory conveyor. Above the conveyor belt were mounted two linear encoders, one upstream encoder and one downstream encoder (with reference to the belt's travel direction), spaced apart from each other at an exactly known distance $L_{LE}$ which was an integer multiple of $1/\xi_m$, and which was thus the same integer multiple of $1/\xi_i$. Each of the linear encoders was capable to produce out of the detected sinusoid raw signal of the marker pattern a quadrature square wave signal on an A and B channels and a pulsed index signal I, with pulses being generated on each rising or falling slope of each of the A and B channels. The spatial frequency $\xi_{LE}$ of either the A or B square wave channel square wave signals was 100,000 m$^{-1}$, thus the spatial frequency on the I channel was 4 times $\xi_{LE}$, thus 400,000 m$^{-1}$. This $\xi_{LE}$ is 2000 times the spatial resolutions 1/$\xi_m$ and 1/$\xi_i$, thus an integer multiple of both these two spatial resolutions. Furthermore near each of the two linear encoders was mounted a photographic camera focusing onto the conveying surface of the belt, with each camera being able to take pictures of the said small test images on the belt's conveying surface. Each of the cameras was controlled by a synchronisation station comprising one associated linear encoder and by a control system in such a way that it would take one photograph of the belt's surface for every 2,000 pulses generated on the I channel of the associated linear encoder, thus, in view of the above mentioned spatial frequency $\xi_{LE}$ of the pulsed signal on the I channel, for every 5 mm of belt travel distance. Thus each camera would take exactly one photograph for every small test image passing the camera.

Once the start of the pattern of small test images passes the first, upstream synchronization station, the control system waited a predefined number of increments (n) from the associated upstream linear encoder. After that number n has been reached, it started to generate a trigger signal for the upstream camera for every 2000 pulses from its associated upstream linear encoder. The photographs generated by the upstream camera were corrected for vignetting effects and brightness and stored on a computer. After the pattern of small test images had completely passed the upstream synchronization station, the photographic acquisition process by the upstream camera was stopped.

When the first trigger signal for the upstream camera was generated based on the output of the upstream linear encoder, the control system waited a predefined integer number of increments from the downstream linear encoder, which predefined number was $L_{LE} \times \xi_{LE}$, and after that predefined number of increments was reached a trigger signal was generated for the downstream camera every 2000 pulses from the downstream encoder. The photographs generated by the downstream camera were also corrected for vignetting effects and brightness and stored on the computer. After the pattern of small test images had completely passed the downstream synchronization station, the photographic acquisition process by the downstream camera was stopped.

Thus, in theory, each photograph of a given small test image, taken by the upstream camera at a count of n×2000 pulses of the associated upstream linear encoder, should give rise to an exactly corresponding (identical) photograph of the same small test image taken by the downstream camera at a count of (n+$L_{LE} \times \xi_{LE}$)×2000 pulses of the associated downstream linear encoder.

Figure 4:
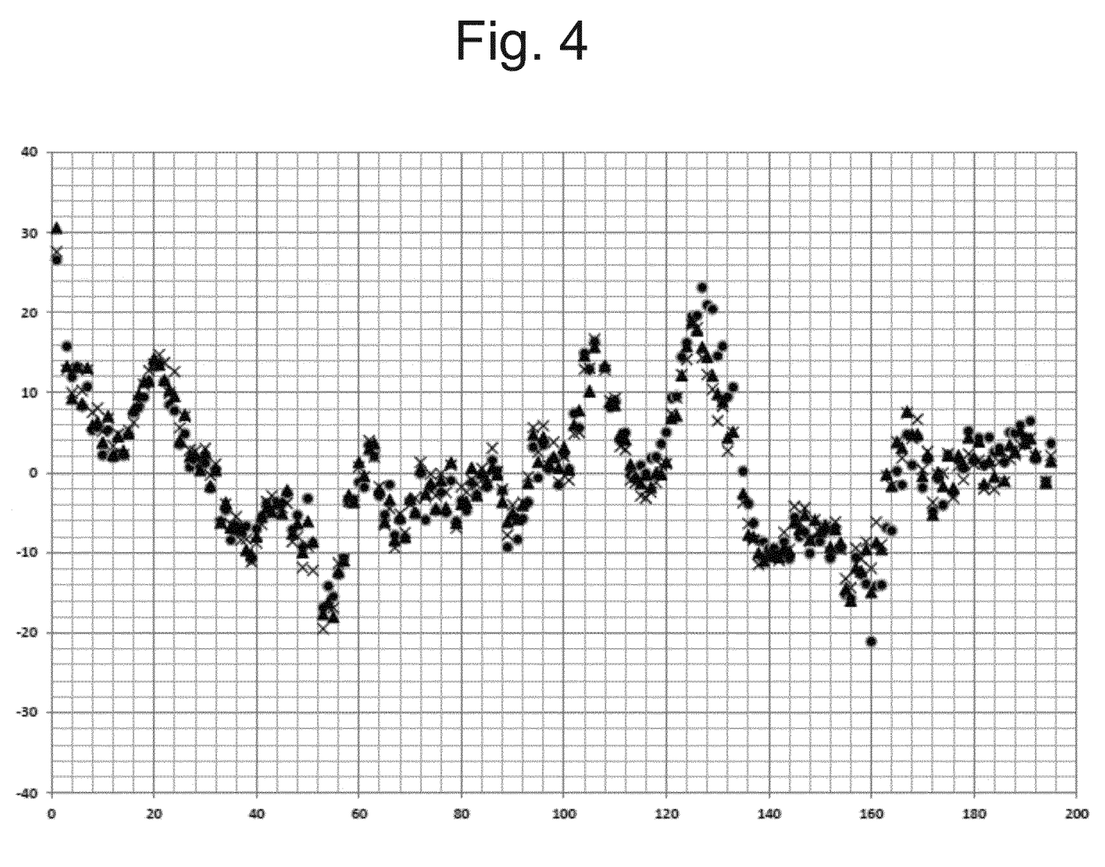

The belt so prepared and set up was conveyed at a nominal belt travel speed of 0.25 m s$^{-1}$. This speed was dictated only by the maximum number of photographs that the cameras could take, namely 60 photographs s$^{-1}$. Taking a photograph at every 5 mm belt travel distance (see above) gives, at 0.25 m s$^{-1}$, 50 photographs that must be taken per second. A series of 3 belt revolutions were done. The corresponding photographs of upstream and downstream camera of a given small test image with index k (as described in the foregoing paragraph) were compared by the computer to find out whether the centers of the test images, as appearing on the two corresponding photographs, deviated from each other by some distance Δx in the horizontal direction of the photographs (which corresponded to the travel direction of the belt during conveying). This distance Δx was considered as the synchronisation error in the longitudinal (travel) direction of the belt. For each photograph with index k, taken with the upstream camera associated with the upstream encoder at pulse count k×2000, the index k was used as an x-axis value. The said deviation distance Δx observed between the center of the test image on that photograph and the center of the test image on the corresponding photograph, taken by the downstream camera associated with the downstream linear encoder at pulse count (k+$L_{LE} \times \xi_{LE}$)×2000, was taken as a corresponding y-axis value. These (x,y) value pairs were plotted as the graph shown in FIG. 4. It is visible that the longitudinal deviations Δx are in the order of +20 micrometers to −20 micrometers. A high-resolution printer will typically have a spatial print frequency $\xi_p$ of 720 dots per inch. The printer resolution, 1/$\xi_p$, which is the width of one image line, is thus about 35 micrometers. The observed deviations are thus less than one such high resolution image line.

Example 2: Endurance Test

An endless belt with a layer construction similar to the one of FIG. 1 was subjected to an endurance test on a conveyor with two pulleys of 250 mm diameter (one driving pulley, one idler pulley). These pulley diameters are somewhat smaller (about 30%) than the diameters of the pulleys in a typical single pass line-head inkjet printer. The belt was bent over each of the two pulleys by 180°. The position of the driving pulley (thus its rotational axis) could be horizontally adjusted with respect to the idler pulley (thus with respect to the idler pulley's rotational axis), to allow a pretensioning of the endless belt. The belt was run at a velocity of 20 m/s until 5 million bending cycles over the pulleys had taken place. There were no signs of delamination of the cover layer and no breaking or material fatigue was observed in either the cover layer or in the magnetic strip. The shape of the sinusoidal signal produced from the magnetic markers was the same before and after the endurance test.

Example 3: Synchronisation Error Test

Figure 5:
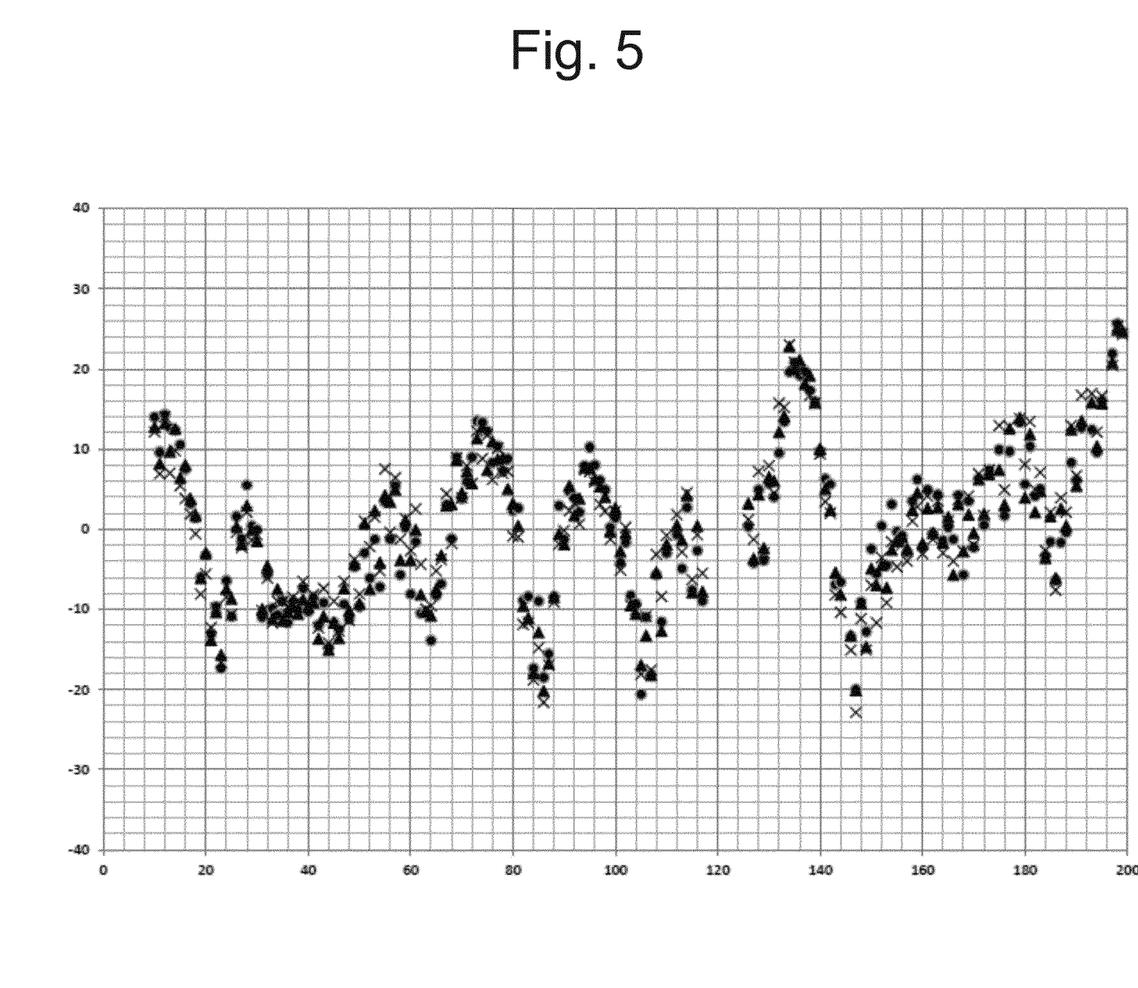

The belt specimen subject to the endurance test of Example 2 was again subject to a synchronisation error test as described in Example 1. The synchronisation errors obtained from that test are shown in FIG. 5. The longitudinal deviations Δx are now somewhat greater than before the endurance test but still acceptable. In view of the presented examples, a belt service life of 1,000,000 to 2,500,000 bending cycles is envisaged.

The invention claimed is:

1. A conveyor belt for conveying a good in a belt travel direction, comprising:
   a) exactly one or exactly two strips of a matrix of an elastomeric, thermoplastic elastomeric or thermoplastic material with particles of a ferromagnetic material embedded therein, the strip(s) being incorporated in the belt, each strip running near one of the lateral edges of the belt;
   b) magnetic markers being arranged in at least one row parallel to the belt's travel direction and being formed into one of the strips of matrix of elastomeric, thermoplastic elastomeric or thermoplastic material with particles of ferromagnetic material embedded therein;
   b) the matrix is filled with the ferromagnetic material particles in an amount of 60 to 90 vol %, based on the sum of matrix and ferromagnetic material particles;
   c) the geometric thickness of the markers is 30 to 70% of the overall thickness of the belt; and
   d) the ferromagnetic material has a maximum energy product (BH)$_{max}$ in the range of 30 to 100 kJ/m$^3$.

2. The belt of claim 1, wherein the material of the matrix is elastomeric or thermoplastic elastomeric.

3. The belt of claim 2, wherein the elastomeric material is NBR or EPDM or the thermoplastic elastomeric material is TPU.

4. The belt of claim 1, wherein the ferromagnetic material is barium ferrite or strontium ferrite.

5. The belt of claim 1, wherein the strip(s) is (are) embedded in a groove formed in a cover layer comprising or consisting of a thermoplastic elastomer or a thermoplastic.

6. The belt of claim 5, wherein in the cover layer the thermoplastic elastomer is TPU or TPO or the thermoplastic is PVC.

7. The belt of claim 1, which is monolithic.

8. The belt of claim 5, which furthermore comprises an upper traction layer, wherein the upper traction layer is arranged below the cover layer.

9. The belt of claim 8, which furthermore comprises a lower traction layer and an intermediate layer comprising a thermoplastic or a thermoplastic elastomer, wherein the intermediate layer is arranged below the upper traction layer and the lower traction layer is arranged below the intermediate layer, such that the intermediate layer is sandwiched between upper traction layer and lower traction layer.

10. The belt of claim 9, wherein the intermediate layer comprises a thermoplastic elastomer or a thermoplastic.

11. The belt of claim 10, wherein in the intermediate layer the thermoplastic elastomer is TPU or TPO or the thermoplastic is PVC.

12. The belt of claim 1, which comprises a top layer comprising a thermoplastic elastomer or a thermoplastic and covering the magnetic markers.

13. The belt of claim 12, wherein in the top layer the thermoplastic elastomer is TPU or TPO or the thermoplastic is PVC.

14. The belt of claim 1, comprising exactly one strip and exactly one row of magnetic markers.

15. The belt of claim 1, wherein the magnetic markers within one row are identical to each other and are evenly spaced in that row such as to form a periodic marker pattern with a spatial frequency $\xi_m$ in the belt's travel direction.

16. The belt of claim 1, which is open-ended and has two ends.

17. The belt of claim 1, which is endless and has an end-joining zone of length $L_j$ in the belt's longitudinal direction.

18. The belt of claim 17, wherein in the end-joining zone of length $L_j$ the magnetic markers are not linear encoder readable.

19. A single pass line-head inkjet printer comprising a belt according to claim 17.

* * * * *